Dec. 17, 1935.  C. L. ADAMS  2,024,790
TELEVISION APPARATUS
Filed Oct. 21, 1932  2 Sheets-Sheet 1
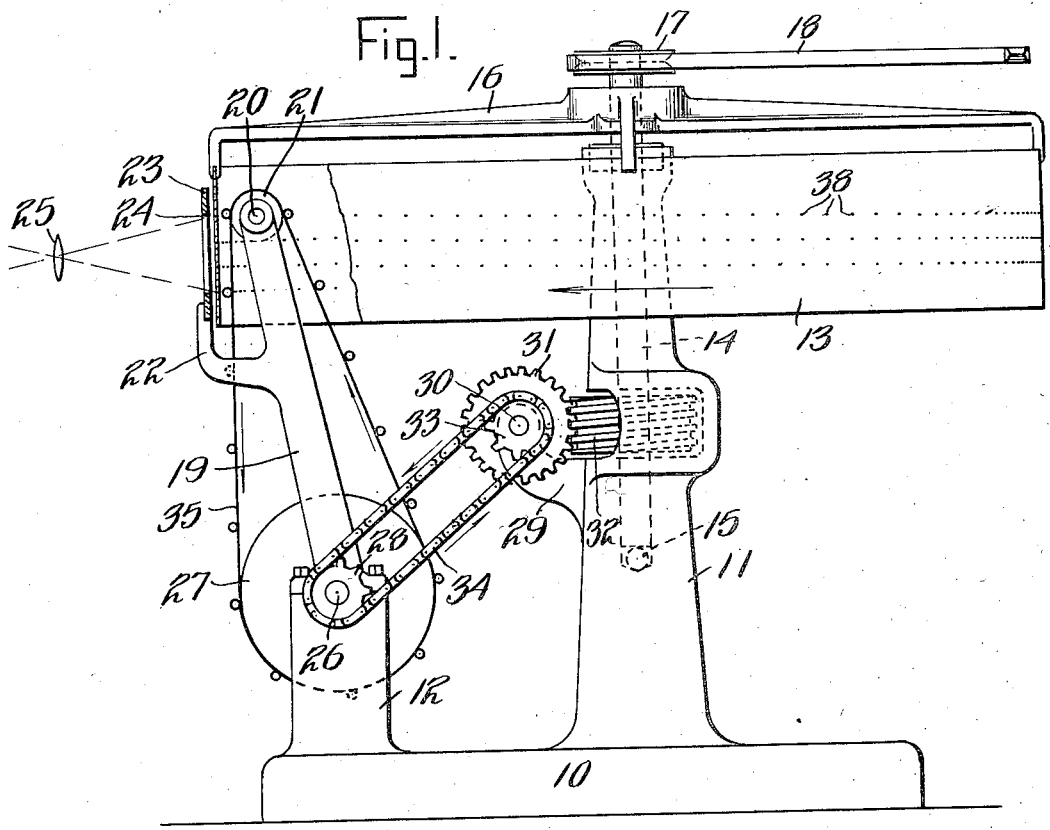
Inventor
Clayton L. Adams
By
Attorney Dec. 17, 1935.   C. L. ADAMS   2,024,790
TELEVISION APPARATUS
Filed Oct. 21, 1932   2 Sheets-Sheet 2
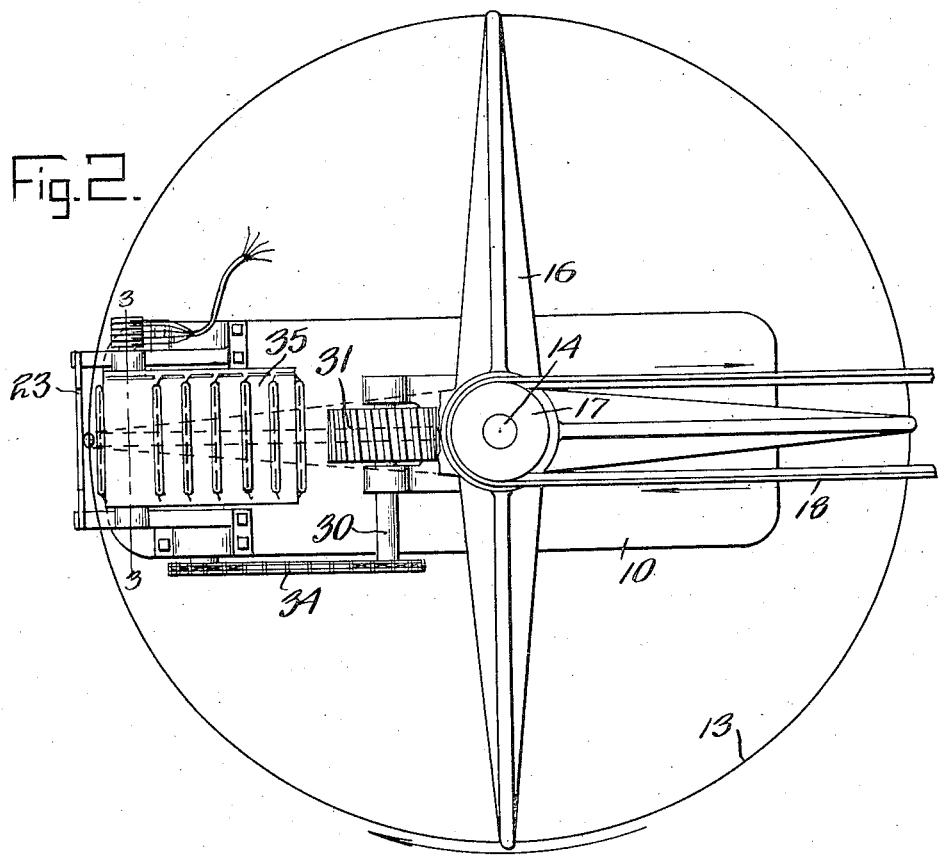
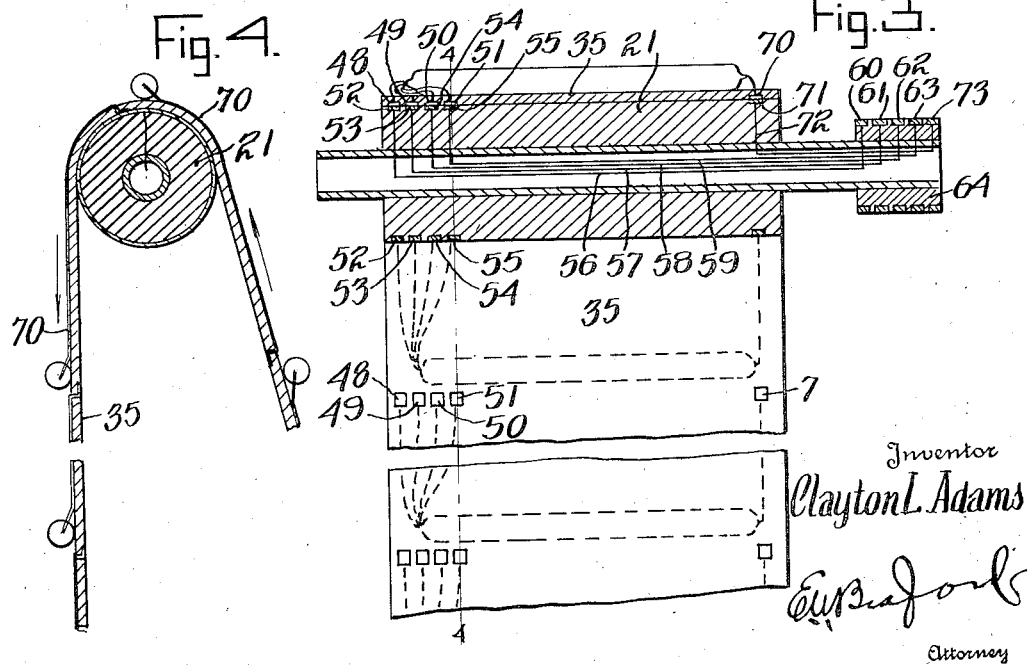
Inventor
Clayton L. Adams
E W Bradford
Attorney Patented Dec. 17, 1935

2,024,790

UNITED STATES PATENT OFFICE 2,024,790

TELEVISION APPARATUS

Clayton Loftin Adams, Jacksonville, Fla., assignor of two-thirds to James S. Francis and one-sixth to Bessie G. Francis, both of Jacksonville, Fla.

Application October 21, 1932, Serial No. 638,953

1 Claim. (Cl. 178—6)

This invention relates to television and its object is to provide new and improved methods and means for scanning in television, picture transmission, and similar systems.

In the art of television many methods have been provided for perfecting analyzing and synthesizing images, these methods employing rotating disks or drums. Also various methods have been provided for concentrating the light of the optical system to insure sufficient brightness and to magnify the image sufficiently. These methods have not been altogether successful because it was necessary for them to be very large in order to secure the proper number of light apertures, these apertures sometimes being lenses or mere holes. These systems moreover have made no attempt to produce an extremely finely detailed picture containing for example a minimum of 120,000 complete units or squares of light in one complete picture together with sufficient brilliance and magnified sufficiently. The minimum of 120,000 complete units is regarded by many leading authorities as necessary in order to produce sufficient detail in large views such for example as football games, horse races, etc. The attempts heretofore made to insure greater fields of view have also fallen short of success. In some of these attempts it had been proposed to employ a combination of shutter disks and scanning drums to insure greater scanning fields. A disadvantage of this is that it requires two or more scanning elements and because of the divergent paths they do not permit equally effective light rays to issue from all parts of the light aperture. Attempts to improve on these systems do not remove the necessity of two scanning elements. Furthermore systems as heretofore built dealing with the brilliance of the light source in the receiving apparatus have objectionable features. In present methods if the light source such as a neon tube is stationary then the scanning elements must employ a plurality of expensive lenses or other light concentrating members to secure sufficient brilliance and size of the viewed image, or else they must resort to simple light apertures such as holes without any light concentrating members. The result is a viewed image of extremely poor brilliance and one which does not lend itself to enlargement of the image with any degree of satisfaction. To overcome these defects the present system proposes first to provide a system of scanning wherein the above noted and other disadvantages are overcome and second to provide a light system in the receiving apparatus which overcomes the disadvantages of the present light systems. The objects above stated are provided by having one scanning member in the form of a circular drum and one light source member in the form of a rotatable flexible band having a plurality of neon tubes for reception or photo electric cells for transmission both so designed that a commutator action associated with the general driving mechanism energizes and de-energizes each neon tube or photo electric cell as it passes through the light aperture thus allowing the full amount of energy to be expressed in the most concentrated form.

Other features and advantages will become apparent from the following detailed description.

Referring to the accompanying drawings, which are made a part hereof and on which similar reference characters indicate similar parts, Figure 1 is a view in elevation of a scanning device embodying the invention, Figure 2, a plan view of the scanning device, Figure 3, an enlarged section on line 3—3 of Figure 2, Figure 4, a section on line 4—4 of Figure 3, Figure 5, a detail view showing one element of the light translating apparatus consisting of a neon tube and its internal structure for reception, and Figure 6, a view of a photo electric cell with its internal elements for transmission.

In the drawings numeral 10 indicates a suitable base for standards 11 and 12 which may be formed integral with the base. A scanning drum 13 is mounted on a spider frame 16 which in turn is mounted on a shaft 14 which is carried by the standard 11. The lower end of the shaft 14 preferably rests upon a bearing 15 as shown. The scanning drum 13 is secured to the outer ends of the spiders 16. To the upper end of the shaft 14 is secured a pulley 17 which is driven by a belt 18 from a suitable motor. An arm 19 is rigidly secured to the standard 12 and on its upper end carries a shaft 20 upon which is mounted a drum 21. Made integral with the arm 19 or secured to it is a second arm 22 upon which second arm is mounted a shutter 23. This shutter is positioned outside of the drum 13 but close to its periphery and is provided with an aperture 24 through which light is projected to or from a lens 25. The standard 12 also carries a shaft 26 upon which is mounted a drum 27, the outer end of the shaft carrying a pinion 28. An arm 29 extends out from the standard 11 and carries a shaft 30 upon which is mounted a worm wheel 31 which is driven by a worm 32 on the shaft 14. The outer end of the shaft 30 carries a sprocket 33 about which travels a sprocket chain 34 by means of which the sprocket 28 is driven from the sprocket 33 and at the same speed. A belt 35 is mounted upon the drums 27 and 21. This belt carries a number of photo electric cells 36 or neon cells 37.

The apparatus just described in Figure 1 applies both as a sending and as a receiving apparatus. When used as a sending apparatus the photo electric cells 36 will be used and light will be projected through the lens 25 and the aperture 24, the light coming from the picture which is being transmitted. When used as a receiving apparatus the neon cells 37 will be used on the belt 35 and light will be projected from these cells through the aperture 24 and through the lens 25 to the screen upon which the picture is to be shown. The periphery of the drum 13 is provided with several series of holes arranged in spiral formation and equally spaced apart. An efficient arrangement consists of three spirals each of which contains 100 holes or perforations 38. These holes are positioned an inch apart and the holes are preferably 1/100 of an inch in diameter. The second series of holes is positioned one inch below the first series and the lower series is one inch below the second series.

The neon cell 37 consists of a glass case or tube from which practically all air has been exhausted and the tube filled with neon gas. Positioned within the tube are four plates 39, 40, 41, and 42 to which are connected positive leads 43, 44, 45, and 46. These leads are sealed in the end of the tube at 47 and pass out of the tube and connect respectively with contacts 48, 49, 50, and 51. The contacts 48, 49, 50, and 51 are positioned so as to engage corresponding contacts 52, 53, 54, and 55 which extend partially around the periphery of the drum 21. The last named contacts are connected through wires 56, 57, 58, and 59 with corresponding contacts 60, 61, 62, and 63 and close circuit with suitable sending apparatus when the device is operating in transmitting a picture. Plates 65, 66, 67, and 68 are all connected by a common wire 69 which is sealed in the tube and passes out of the tube and is connected to contact 70. This contact engages a contact 71 on the drum 70 which latter contact is connected by wire 72 to a contact 73 on the periphery of the drum 64. The contact 73 with the leads thereto represent the negative circuit while the contacts 60, 61, 62, and 63 are the four positive circuits.

The photo electric cell 36 is quite similar in appearance to cell 37. In this case the photo electric cell comprises a glass envelope or tube which is filled with argon or other gas. The anode 75 is connected by a wire 76 which is sealed in the end of the tube and this wire connects with a contact which engages the negative contact on the drum 64 as shown in Figure 3. Photo electric cells 77, 78, 79, and 80 are simply small pieces of glass wire preferably 1/100 of an inch wide and one inch in length. These wires are impregnated with some alkali material such as potassium or caesium. Each of the photo electric cells is connected by wires 81, 82, 83, and 84 which wires are sealed in the end of the tube and connected to contacts not shown but corresponding to the contacts 48, 49, 50, and 51 in Figure 3.

In operation the drum 13 will be driven at a suitable speed; for efficient operation the speed should be 45 revolutions per second. Since there are 100 holes an inch apart, the circumference of the drum 13 will be exactly 100 inches. By means of the driving connection to the shaft 14 and the belt 35 the belt 35 will be driven at a speed which will move one of the tubes on the belt from the top to the bottom series of holes, i. e. with the series of holes positioned with their diameters one inch apart the belt 35 will be driven exactly three inches while the drum 13 makes three revolutions. The purpose is to have only one cell adjacent the perforations 38 at a time. As soon as the lower cell is leaving the last perforation on the drum the above cell will be coming into exposed relation with the perforation. It is understood that each neon tube or photoelectric cell has its four surfaces or light translating areas scanned horizontally, simultaneously. In other words, there are always four holes on any spiral, through which light is passing at one time, each of these four holes is allowing light to pass through itself, from the neon tube, or to the photo-electric cell.

A receiving apparatus which is similar in all respects to the sending except the difference in the cells on the belt 35 will be driven at exactly the same speed as the sending apparatus. From the foregoing description and illustrations it will be seen that as the scanning drum is traversed the light translating member consisting of the rotatable band will pursue a vertical course in direct timed relation to the drum. It is obvious therefore that there must be one complete vertical traversal of the light translating apparatus for each three revolutions of the scanning drum. The pitch of the neon tubes or photo electric cells is very slightly off horizontal with the right hand end inclined about 1/100 of an inch toward the bottom of the rotating band. This is to allow one hole at a time to allow light to pass through. The light therefore is concentrated fully in a very minute space without the use of lenses or other concentrating members.

It will be obvious to those skilled in the art that various changes may be made in my device without departing from the spirit of the invention and therefore I do not limit myself to what is shown in the drawings and described in the specification, but only as indicated by the appended claim.

Having thus fully described my said invention, what I claim as new and desire to secure by Letters Patent, is:

In a television system, a scanning device comprising a drum having a series of perforations arranged in spiral formation, means for rotating the drum at a fixed speed, a second drum rotatably mounted within the first named drum, a band mounted on said second drum, said band having a plurality of light sensitive cells positioned transversely thereon each of said cells having a plurality of light sensitive elements mounted therein each of said elements having connections with a contact on the belt, the said second drum having contact corresponding with those on the said belt, means for moving the belt in timed relation with the rotation of the first named drum, the said cells being in contact with the said second drum for a predetermined fraction of a revolution of said second drum, substantially as set forth.

CLAYTON LOFTIN ADAMS.